United States Patent
Teng et al.

(10) Patent No.: US 11,314,337 B1
(45) Date of Patent: Apr. 26, 2022

(54) KEY PRESS DETECTION

(71) Applicant: QUALCOMM Incorporated, San Diego, CA (US)

(72) Inventors: Diyan Teng, Santa Clara, CA (US); Mehul Soman, San Jose, CA (US); Rashmi Kulkarni, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/302,612

(22) Filed: May 7, 2021

(51) Int. Cl.
*G06F 3/023* (2006.01)
*G06F 3/04886* (2022.01)

(52) U.S. Cl.
CPC ........ *G06F 3/0231* (2013.01); *G06F 3/04886* (2013.01)

(58) Field of Classification Search
CPC ........ G06F 3/021; G06F 3/023; G06F 3/0304; G06F 3/0202; G06F 3/0231; G06F 3/04886; G06F 3/042; G06F 3/0421; H03K 17/943; H03K 17/9629; H03K 17/9627
See application file for complete search history.

(56) References Cited

U.S. PATENT DOCUMENTS

| | | | | |
|---|---|---|---|---|
| RE33,422 E | * | 11/1990 | Garcia, Jr. | G06F 3/0202 250/229 |
| 8,766,920 B2 | * | 7/2014 | Wang | G06F 1/1662 345/168 |
| 10,394,341 B1 | * | 8/2019 | Wang | G06F 3/021 |
| 10,613,640 B2 | * | 4/2020 | Wang | G06F 3/0304 |
| 2006/0066576 A1 | * | 3/2006 | Kong | G06F 3/0213 345/168 |
| 2013/0196716 A1 | * | 8/2013 | Muhammad | G06F 3/046 455/566 |
| 2019/0354196 A1 | * | 11/2019 | Wang | G06F 3/0202 |
| 2021/0109194 A1 | * | 4/2021 | Bench | G01S 7/487 |

\* cited by examiner

*Primary Examiner* — Rodney Amadiz
(74) *Attorney, Agent, or Firm* — Qualcomm Incorporated

(57) ABSTRACT

Various aspects of the present disclosure generally relate to object detection. In some aspects, a device may include a housing; an input device adjoined to the housing, the input device configured to receive an input associated with a press of a key of a plurality of keys; one or more transmitters disposed in the housing, the one or more transmitters configured to transmit one or more signals toward the plurality of keys; one or more receivers disposed in the housing, the one or more receivers configured to receive one or more return signals corresponding to the one or more signals; and a processor configured to determine a location of the key based at least in part on the one or more return signals.

30 Claims, 7 Drawing Sheets

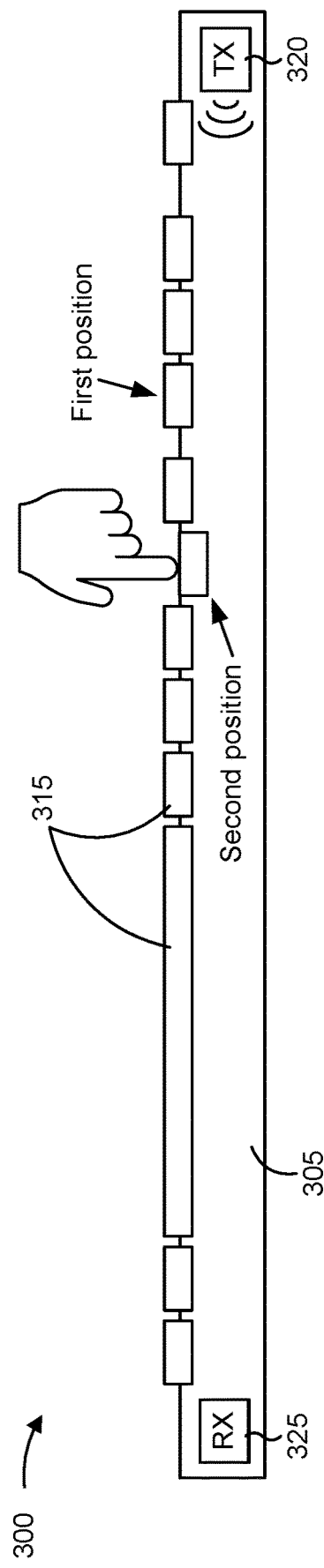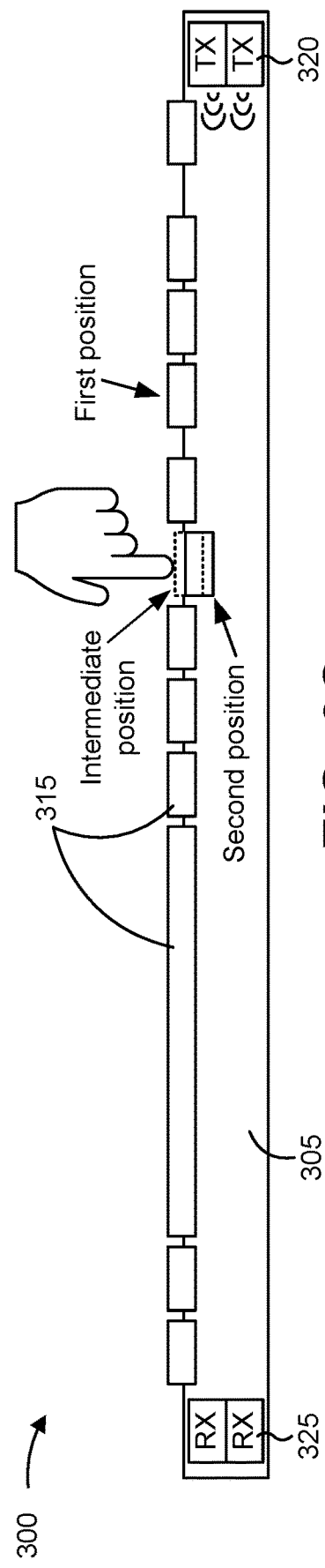

KEY PRESS DETECTION

FIELD OF THE DISCLOSURE

Aspects of the present disclosure generally relate to object detection and, for example, to key press detection.

BACKGROUND

Devices may communicate using the electromagnetic spectrum, which may be subdivided based on frequency or wavelength into various classes, bands, channels, or the like. For example, devices may communicate using an operating band having a first frequency range (FR1), which may span from 410 megahertz (MHz) to 7.125 gigahertz (GHz), and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band.

Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

SUMMARY

In some implementations, a device includes a housing; an input device adjoined to the housing, the input device configured to receive an input associated with a press of a key of a plurality of keys; one or more transmitters disposed in the housing, the one or more transmitters configured to transmit one or more signals toward the plurality of keys; one or more receivers disposed in the housing, the one or more receivers configured to receive one or more return signals corresponding to the one or more signals; and a processor configured to determine a location of the key based at least in part on the one or more return signals.

In some implementations, a method includes transmitting, by a device using one or more transmitters of the device, one or more signals toward a plurality of keys of an input device of the device; receiving, by the device using one or more receivers of the device, one or more return signals corresponding to the one or more signals; and determining, by the device based at least in part on the one or more return signals, a location of a key, of the plurality of keys, that is pressed.

In some implementations, a non-transitory computer-readable medium storing a set of instructions includes one or more instructions that, when executed by one or more processors of a device, cause the device to: transmit, using one or more transmitters of the device, one or more signals toward a plurality of keys of an input device of the device; receive, using one or more receivers of the device, one or more return signals corresponding to the one or more signals; and determine, based at least in part on the one or more return signals, a location of a key, of the plurality of keys, that is pressed.

In some implementations, an apparatus includes means for transmitting, using one or more transmitters of the apparatus, one or more signals toward a plurality of keys of an input device of the apparatus; means for receiving, using one or more receivers of the apparatus, one or more return signals corresponding to the one or more signals; and means for determining, based at least in part on the one or more return signals, a location of a key, of the plurality of keys, that is pressed.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3B is a side cross-sectional view of an embodiment of the device taken along line A-A of FIG. 3A, in accordance with the present disclosure.

FIG. 3C is a side cross-sectional view of an embodiment of the device taken along line A-A of FIG. 3A, in accordance with the present disclosure.

DETAILED DESCRIPTION

Figure 1:
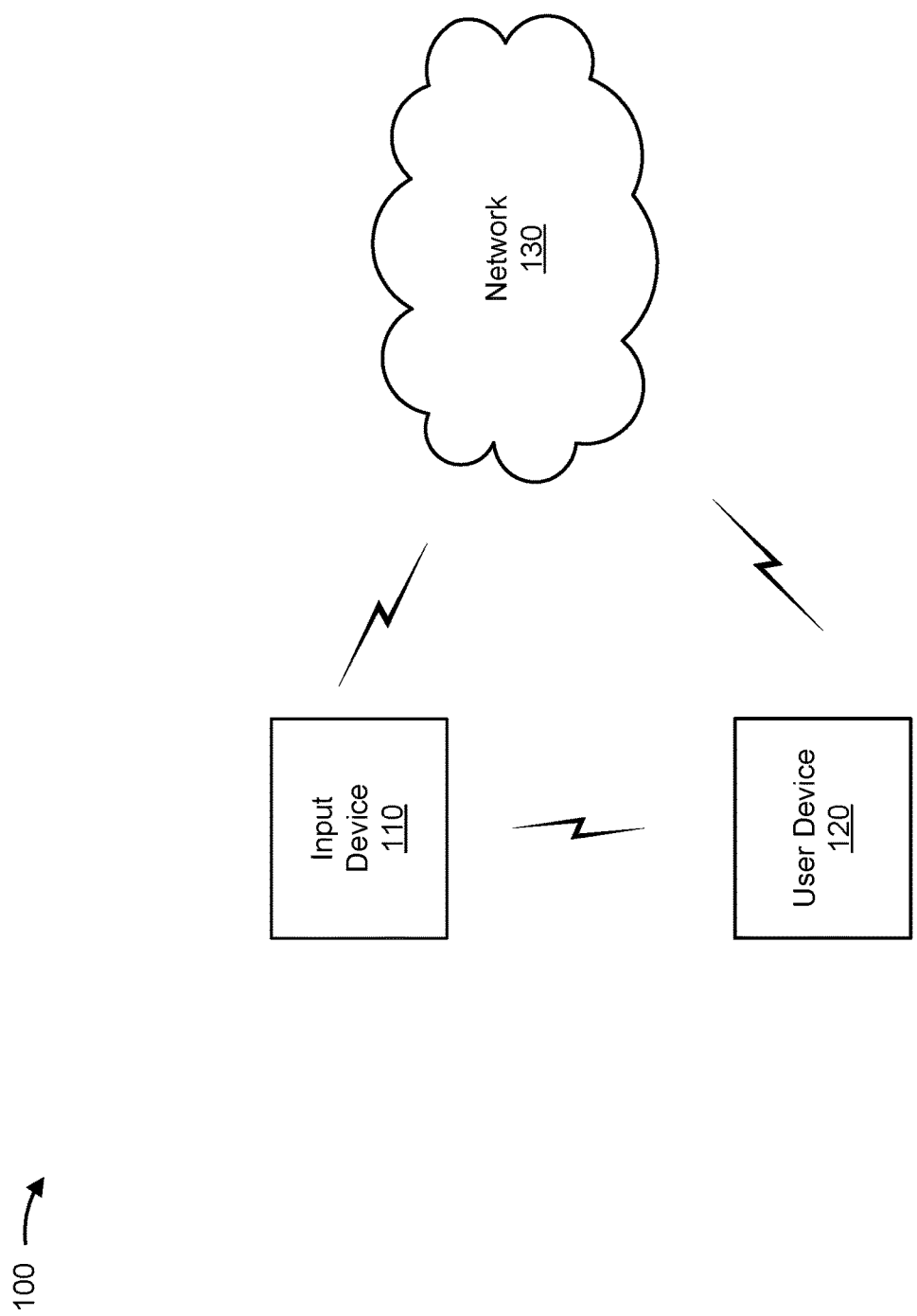
FIG. 1 is a diagram illustrating an example environment in which key press detection described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A keyboard may be used as an input device for a computer. The keyboard may operate using one of several key press input techniques. For example, the keyboard may be a membrane keyboard, a mechanical keyboard, or an optical keyboard. An optical keyboard may use respective optical switches for each key of the keyboard in order to detect when a key is pressed. Here, an optical switch may include a light emitter (e.g., an infrared (IR) light emitting diode (LED)), to direct light toward a key, and a light sensor (e.g., an IR sensor) to detect light reflected from the key. Thus, the light sensor may detect a change in the light reflected from the key (e.g., a change in a travel distance of the light, a change in a path of travel of the light, or the like), to thereby detect when the key is pressed. An optical keyboard may have a longer lifespan and a faster response time relative to a membrane keyboard or a mechanical keyboard. However, due to the use of separate optical switches for each key, an optical keyboard is excessively complex and includes numerous parts that are prone to failure.

Some techniques and apparatuses described herein provide a device (e.g., a keyboard, a computing device that includes a keyboard, or a touchscreen device that displays a keyboard) enabled to detect a key press using a set of transmitters and a set of receivers (e.g., operating using a multiple input multiple output (MIMO) scheme). The set of transmitters and the set of receivers may operate in a radio frequency (RF) band, such as a millimeter wave (mmWave) band (e.g., which improves detection resolution). In some aspects, the set of transmitters may transmit a signal toward the keys of a keyboard, and the signal may reflect from a key that is pressed or from a part of a user's body (e.g., the user's finger) or an implement that is touching a key. In some aspects, the set of receivers may receive the reflected signal (e.g., the return signal), and the device may determine a location of the key based at least in part on the reflected signal. In this way, the device utilizes simplified key press detection that uses relatively fewer parts, while providing fast response time.

FIG. 1 is a diagram of an example environment 100 in which key press detection described herein may be implemented, in accordance with the present disclosure. As shown in FIG. 1, environment 100 may include an input device 110, a user device 120, and a network 130. Devices of environment 100 may interconnect via wired connections, wireless connections, or a combination of wired and wireless connections.

The input device 110 includes one or more devices capable of receiving an input associated with a press of a key (or otherwise associated with a displacement of a key). In some aspects, the input device 110 may include a keyboard that includes a plurality of keys (e.g., mechanical keys or pressure pads). In some aspects, the input device 110 may include a touchscreen display. The touchscreen display may be capable of displaying a keyboard that includes a plurality of keys. In some aspects, the input device 110 may receive, generate, store, process, and/or provide information associated with a press of a key.

The user device 120 includes one or more devices capable of receiving, generating, storing, processing, and/or providing information associated with a press of a key. The user device 120 may include a communication device and/or a computing device. For example, the user device 120 may include a wireless communication device, a mobile phone, a user equipment, a laptop computer, a tablet computer, a desktop computer, a gaming console, a set-top box, a wearable communication device (e.g., a smart wristwatch), or a similar type of device. In some aspects, the user device 120 may include the input device 110 (e.g., in a housing of the user device 120). In some aspects, the input device 110 and the user device 120 may communicate via a wireless connection and/or a wired connection.

The network 130 includes one or more wired and/or wireless networks. For example, the network 130 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 130 enables communication among the devices of environment 100. For example, the input device 110 and the user device 120 may communicate via the network 130.

The quantity and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
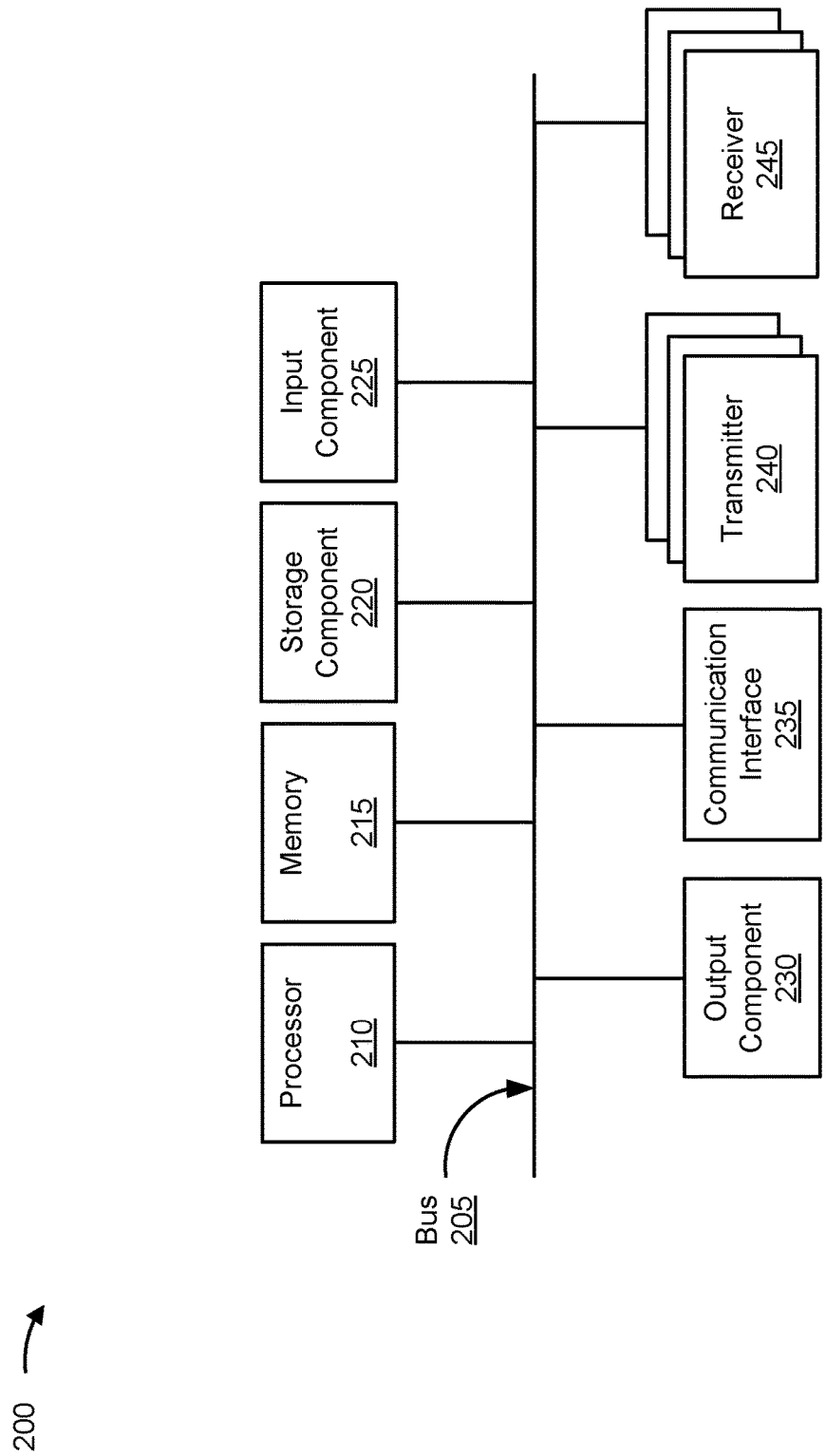
FIG. 2 is a diagram illustrating example components of one or more devices shown in FIG. 1, in accordance with the present disclosure.

FIG. 2 is a diagram illustrating example components of a device 200, in accordance with the present disclosure. Device 200 may correspond to input device 110 and/or user device 120. In some aspects, input device 110 and/or user device 120 may include one or more devices 200 and/or one or more components of device 200. As shown in FIG. 2, device 200 may include a bus 205, a processor 210, a memory 215, a storage component 220, an input component 225, an output component 230, a communication interface 235, one or more transmitters 240, and/or one or more receivers 245.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touchscreen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency (RF) interface, a universal serial bus (USB) interface, a wireless local area interface (e.g., a Wi-Fi interface), and/or a cellular network interface.

A transmitter 240 includes one or more devices that communicate using the electromagnetic spectrum. For example, transmitter 240 may generate and transmit electromagnetic waves using an antenna. Transmitter 240 may include an RF transmitter. For example, transmitter 240 may include a mmWave transmitter. A receiver 245 includes one or more devices that communicate using the electromagnetic spectrum. For example, receiver 245 may receive and process electromagnetic waves using an antenna. Receiver 245 may include an RF receiver. For example, receiver 245 may include a mmWave receiver. In some aspects, a transmitter 240 and a receiver 245 may share circuitry or may be otherwise packaged together. For example, a transmitter 240 and a receiver 245 may be included in a transceiver.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for transmitting one or more signals toward a plurality of keys of an input device; means for receiving one or more return signals corresponding to the one or more signals; means for determining, based at least in part on the one or more return signals, a location of a key, of the plurality of keys, that is pressed; or the like. In some aspects, such means may include one or more components of device 200 described in connection with FIG. 2, such as bus 205, processor 210, memory 215, storage component 220, input component 225, output component 230, communication interface 235, transmitter(s) 240, and/or receiver(s) 245.

The quantity and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
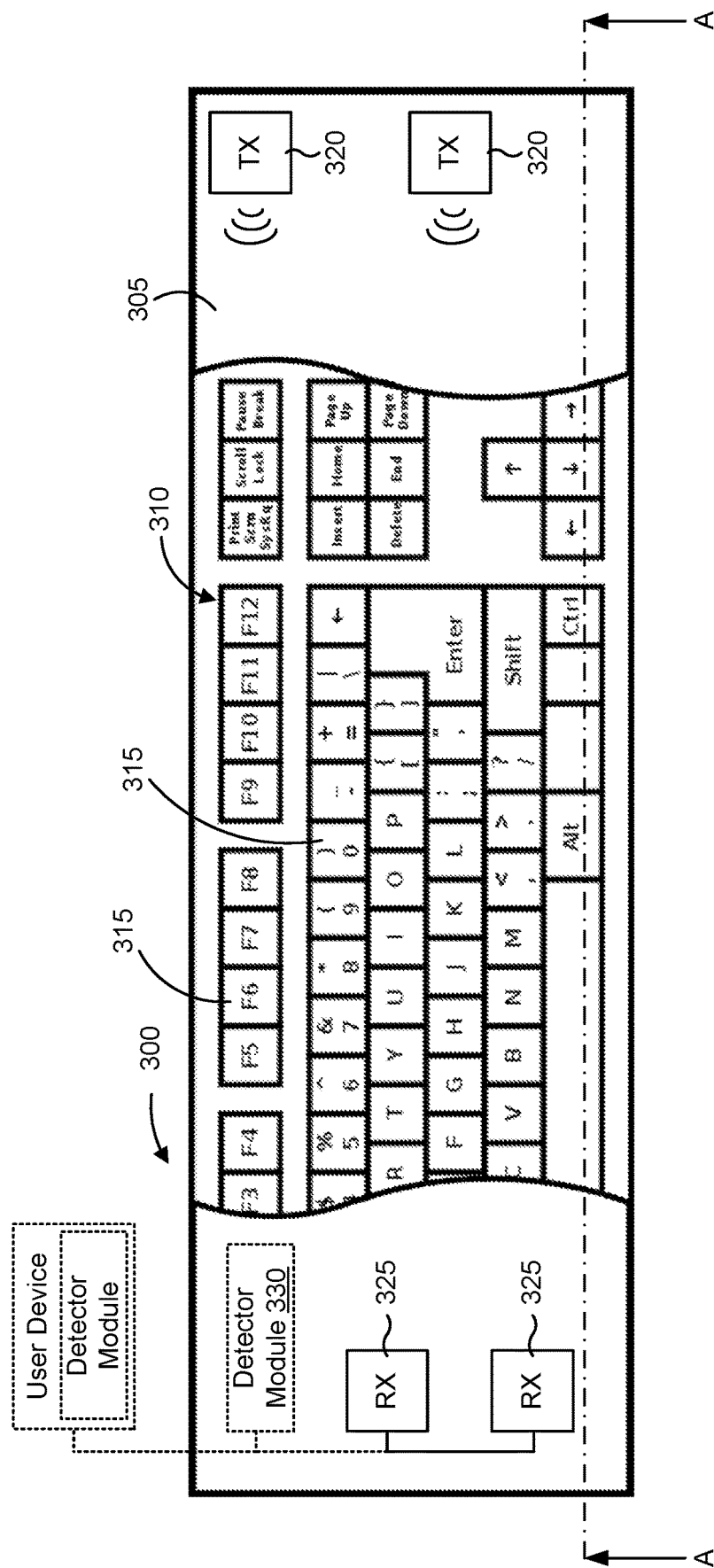
FIG. 3A is a top cutaway view of an example device, in accordance with the present disclosure.

FIG. 3A is a top cutaway view of an example device 300, in accordance with the present disclosure. As shown in FIG. 3A, the device 300 may be a keyboard device (e.g., a standalone keyboard device). However, in some examples, the device 300 may be a user device (e.g., a laptop computer) that includes a keyboard or a user device (e.g., a tablet computer) that can display a keyboard (e.g., on a touchscreen display).

The device 300 may include a housing 305. The housing 305 may define an internal compartment of the device 300. The housing 305 may contain, in the internal compartment, one or more components of the device 300, such as one or more of the components described above in connection with FIG. 2.

In some aspects, an input device 310 may be adjoined to (e.g., attached to, disposed on, disposed in, or the like) the housing 305. In some aspects, as shown, the input device 310 may include a keyboard (e.g., of a keyboard device or of a user device), and the keyboard may include a plurality of keys 315. Here, the keyboard may be disposed in the housing 305, and at least portions of the plurality of keys 315 may extend through one or more apertures in a surface of the housing 305. The plurality of keys 315 may be discrete keys or pressure pads of a common membrane.

In some aspects, the input device 310 may include a touchscreen display (e.g., of a tablet computer), and the touchscreen display may be configured to display a keyboard that includes the plurality of keys 315. Here, the touchscreen display may be attached to the housing 305. Moreover, the plurality of keys 315 may be visually represented on the touchscreen display.

The input device 310 may be configured to receive an input associated with a press of a key 315 of the plurality of keys 315. For example, a user may press a key 315 of a keyboard by applying a force to the key 315, and the key 315 may displace into the housing 305 when the user presses the key 315. As another example, a user may press a key 315 of a touchscreen display by touching a visual representation of the key 315 on the touchscreen display.

In some aspects, a set of (e.g., one or more) transmitters 320 (shown as "TX") may be disposed in the housing 305 (e.g., in the internal compartment defined by the housing 305). The set of transmitters 320 may be spaced (e.g., evenly spaced) from one another. The set of transmitters 320 may be configured to transmit signals (e.g., one or more signals) toward (e.g., in a direction of) the plurality of keys 315. For example, each transmitter 320, of the set of transmitters 320, may be configured to transmit a signal toward the plurality of keys 315.

In some aspects, a transmitter 320 may be configured to transmit a signal that is a pulse signal (e.g., a radar pulse). In some aspects, a transmitter 320 may be configured to transmit a signal that is a continuous wave signal (e.g., a frequency modulated continuous wave (FMCW) signal, such as an FMCW radar signal). In some aspects, a transmitter 320 may be configured to transmit a signal that is in an RF band (e.g., in FR1 or in FR2). For example, the signal may be in a mmWave band (e.g., in FR2). Accordingly, the set of transmitters 320 may include RF transmitters. For example, the set of transmitters 320 may include mmWave transmitters. In some aspects, a transmitter 320 may be configured to transmit a signal in another band, such as a microwave band.

In some aspects, a set of (e.g., one or more) receivers 325 (shown as "RX") may be disposed in the housing 305 (e.g., in the internal compartment defined by the housing 305). The set of receivers 325 may be spaced (e.g., evenly spaced) from one another. The set of receivers 325 may be configured to receive return signals (e.g., one or more return signals) corresponding to the transmitted signals. A return signal may be reflected from a key 315 that is pressed (e.g., on a keyboard), or reflected from a part of a user's body (e.g., the user's finger) that is pressing a key 315 (e.g., on a touchscreen display). Each receiver 325, of the set of receivers 325, may be configured to receive the return signals of the signals transmitted by the set of transmitters 320.

In some aspects, a receiver 325 may be configured to receive a signal that is a pulse signal. In some aspects, a receiver 325 may be configured to receive a signal that is a continuous wave signal (e.g., an FMCW signal). In some aspects, a receiver 325 may be configured to receive a signal that is in an RF band (e.g., in FR1 or in FR2). For example, the signal may be in a mmWave band (e.g., in FR2). Accordingly, the set of receivers 325 may include RF receivers. For example, the set of receivers 325 may include mmWave receivers. In some aspects, a receiver 325 may be configured to receive a signal in another band, such as a microwave band.

The set of transmitters 320 and the set of receivers 325 may be configured for MIMO operation (e.g., the transmissions of each of the transmitters 320 may be received at each of the receivers 325). In some aspects, the set of transmitters 320 may include multiple transmitters 320, and the set of receivers 325 may include multiple receivers 325. In some aspects, the set of transmitters 320 and the set of receivers 325 may be configured for single input multiple output (SIMO) operation or for multiple input single output (MISO) operation. For example, the set of transmitters 320 may include multiple transmitters 320, and the set of receivers 325 may include one receiver 325. As another example, the set of transmitters 320 may include one transmitter 320, and the set of receivers 325 may include multiple receivers 325. In this way (e.g., using multiple transmitters 320 and/or multiple receivers 325), a two-dimensional location (e.g., coordinates) of a key 315 that is pressed may be detected by the device 300.

The quantity of transmitters 320 in the set of transmitters 320 may be less than a quantity of keys 315 of the input device 310. Moreover, the quantity of receivers 325 in the set of receivers 325 may be less than the quantity of keys 315. For example, detection of a key press from among the plurality of keys 315 (e.g., 50 or more keys 315, 75 or more keys 315, or 100 or more keys 315) may be accomplished using only five or fewer, four or fewer, three or fewer, or two or fewer of each of the transmitters 320 and the receivers 325. In this way, the device 300 utilizes a simplified design with relatively fewer parts. For example, a transmitter 320 and a receiver 325 pair is not needed underneath each of the plurality of keys 315.

In some aspects, the set of transmitters 320 may be located at a first end of the housing 305, and the set of receivers 325 may be located at a second end of the housing 305 (e.g., relative to a center line of the housing 305). For example, the set of transmitters 320 may be located to a first side of the plurality of keys 315, and the set of receivers 325 may be located to a second side of the plurality of keys 315. In other words, the plurality of keys 315 may be between the set of transmitters 320 and the set of receivers 325. This configuration of the transmitters 320 and the receivers 325 may be referred to as a "passthrough" configuration.

The device 300 may include a detector module 330. The detector module 330 may include one or more processors (e.g., processor 210), one or more memories (e.g., memory 215), or the like. In some aspects, a detector module may be external to the device 300 (e.g., to satisfy particular power specifications, form factor specifications, or the like). In some aspects, a user device, or the like, communicatively connected to the device 300 may include a detector module (e.g., in addition or alternatively to the detector module 330 of the device 300). Here, the detector module may include code (e.g., a decoding application) executing on one or more processors of the user device. The detector module 330 (and/or the detector module of the user device) may be configured to receive information relating to the received return signals from the set of receivers 325. Moreover, the detector module 330 (and/or the detector module of the user device) may be configured to determine a location of a key 315 that is pressed based at least in part on the return signals, as described below in connection with FIG. 4. In other words, the return signals may indicate the location of the key 315.

In some aspects, the device 300 may include an isolation layer (not shown). The isolation layer may be adjoined to an exterior surface of the housing 305, may be embedded into the housing 305, or may be adjoined to an interior surface of the housing 305. The isolation layer may be configured to isolate the set of transmitters 320 and the set of receivers 325 from external signals (e.g., electromagnetic signals external to the device 300). For example, the isolation layer may be configured to block electromagnetic waves (e.g., the isolation layer may include an electromagnetic wave-blocking material).

In some aspects, the isolation layer may surround the set of transmitters 320 and the set of receivers 325. In this way, an air channel between the set of transmitters 320 and the set of receivers 325 is controlled and predictable. In some aspects, the isolation layer may only partially surround the set of transmitters 320 and the set of receivers 325, or the isolation layer may be omitted from the device 300. For example, in connection with a touchscreen display, the device 300 may omit the isolation layer, or may employ a partial isolation layer, to permit the transmitted signals to pass through the touchscreen display and reflect from a part of a user's body (e.g., the user's finger) in contact with the touchscreen display.

As indicated above, FIG. 3A is provided as an example. Other examples may differ from what is described with regard to FIG. 3A.

FIG. 3B is a side cross-sectional view of an embodiment of the device 300 taken along line A-A of FIG. 3A, in accordance with the present disclosure. As shown in FIG. 3B, a key 315 may be configured to displace from a first position (e.g., an equilibrium position) to a second position (e.g., when a user presses the key 315). In the first position, the key 315 may be away from a path of the signal(s) transmitted by the set of transmitters 320. That is, in the first position, the transmitted signals may not reach or reflect from the key 315 (or may reflect from the key 315 in a manner that is associated with an equilibrium state of the device 300). In the second position, at least a portion of the key 315 may be in a path of the signal(s) transmitted by the set of transmitters 320. That is, in the second position, the transmitted signals may reflect from the key 315 (e.g., in a manner indicative of a press of the key 315). In this way, return signals received at the set of receivers 325 may be different depending on whether a key 315 is in the first portion or in the second position, thereby enabling detection of a key press, as described below in connection with FIG. 4.

In some aspects, a key 315 may include a reflector (not shown) that extends from an underside of the key 315 (e.g., a side of the key 315 opposite a pressing side of the key 315). The reflector may facilitate reflection of the transmitted signals from the key 315 (e.g., by increasing a surface area of the key 315 that is in the path of the transmitted signals).

As indicated above, FIG. 3B is provided as an example. Other examples may differ from what is described with regard to FIG. 3B.

FIG. 3C is a side cross-sectional view of an embodiment of the device 300 taken along line A-A of FIG. 3A, in accordance with the present disclosure. As shown in FIG. 3C, a key 315 may be configured to displace to one or more intermediate positions (shown in dashed line) between the first position and the second position. That is, a user may press the key 315 to varying depths (a particular depth of which may be referred to as an "intensity" of a key press).

In some aspects, the set of transmitters 320 may be located at multiple depths within the housing 305 (e.g., in a stacked configuration), and may be configured to transmit the signals toward the plurality of keys 315 from the multiple depths. In some aspects, the set of receivers 325 may be located at multiple depths (e.g., the same depths as the transmitters 320 or different depths) within the housing 305 (e.g., in a stacked configuration), and may be configured to receive the return signals at the multiple depths. For example, a first set (e.g., one or more) of transmitters 320 may be located at a first depth within the housing 305 (e.g., nearer to a surface of the housing 305 in which the plurality of keys 315 are exposed), and a second set (e.g., one or more) of transmitters 320 may be located at a second depth within the housing 305 (e.g., further from the surface). Continuing with the example, a first set (e.g., one or more) of receivers 325 may be located at a first depth within the housing 305 (e.g., nearer to the surface), and a second set (e.g., one or more) of receivers 325 may be located at a second depth within the housing 305 (e.g., further from the surface).

In this way (e.g., using multiple transmitters 320 at different depths and/or multiple receivers 325 at different depths), a three-dimensional location (e.g., coordinates) of a key 315 that is pressed may be detected. That is, a location of a key 315 that is pressed, as well as an intensity of the press (e.g., depth information), may be detected.

As indicated above, FIG. 3C is provided as an example. Other examples may differ from what is described with regard to FIG. 3C.

Figure 3D:
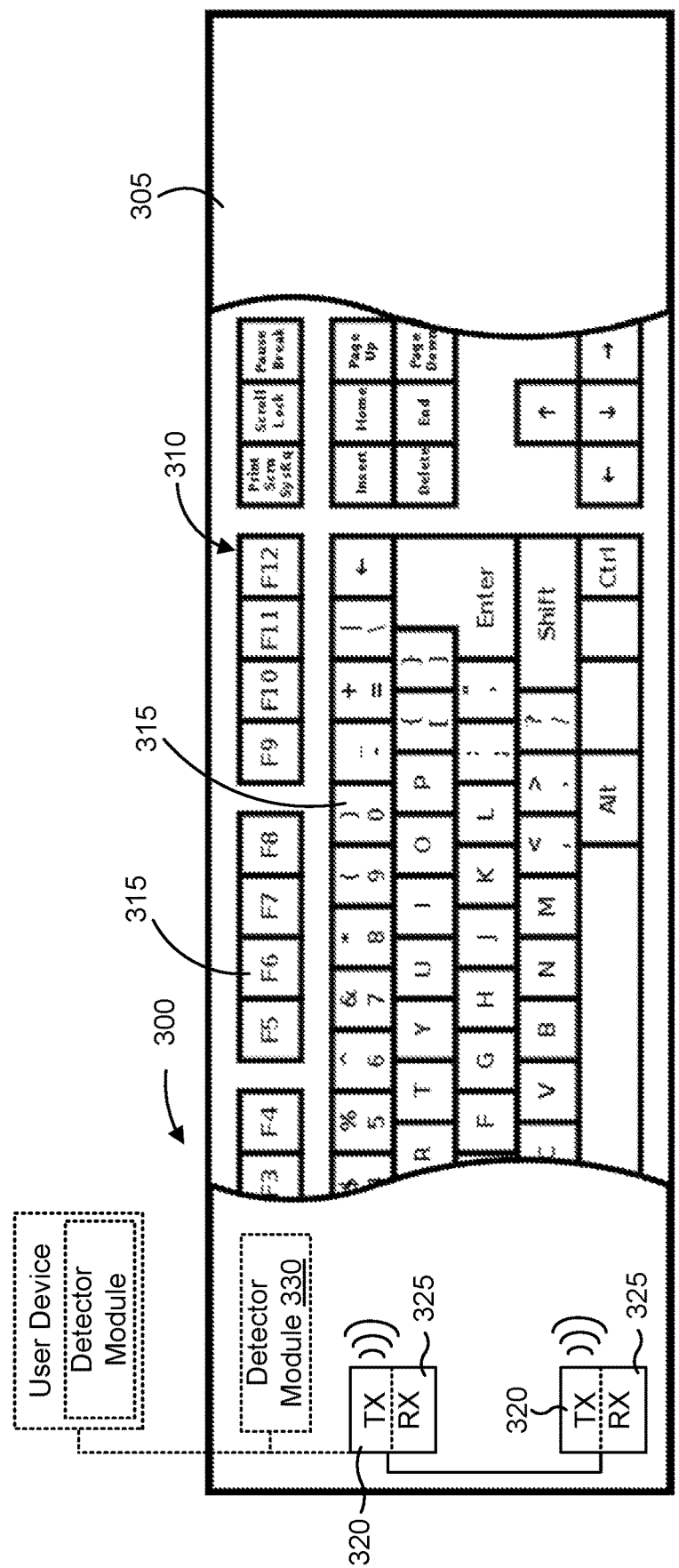
FIG. 3D is a top cutaway view of an embodiment of the device, in accordance with the present disclosure.

FIG. 3D is a top cutaway view of an embodiment of the device 300, in accordance with the present disclosure. As shown in FIG. 3D, in some aspects, the set of transmitters 320 and the set of receivers 325 may be located at the same end of the housing 305 (e.g., relative to a center line of the housing 305). For example, the set of transmitters 320 and the set of receivers 325 may be located to the same side of the plurality of keys 315. This configuration of the transmitters 320 and the receivers 325 may be referred to as a "backscatter" configuration. In some aspects, in the backscatter configuration, a transmitter 320 and a receiver 325 may share circuitry or may be otherwise packaged together. For example, the device 300 may include a plurality of transceivers in the backscatter configuration.

In some aspects, a first transmitter 320 and receiver 325 may be located at an end of the housing 305 (e.g., along a short edge, as shown, of the device 300), and a second transmitter 320 and receiver 325 may be located at a side of the housing 305 adjacent to the end of the housing 305 (e.g., along a long edge, as shown, of the device 300). In this way, the first transmitter 320 and receiver 325 may detect an x-coordinate of a key 315 that is pressed, and the second transmitter 320 and receiver 325 may detect a y-coordinate of the key 315.

As indicated above, FIG. 3D is provided as an example. Other examples may differ from what is described with regard to FIG. 3D.

Figure 4:
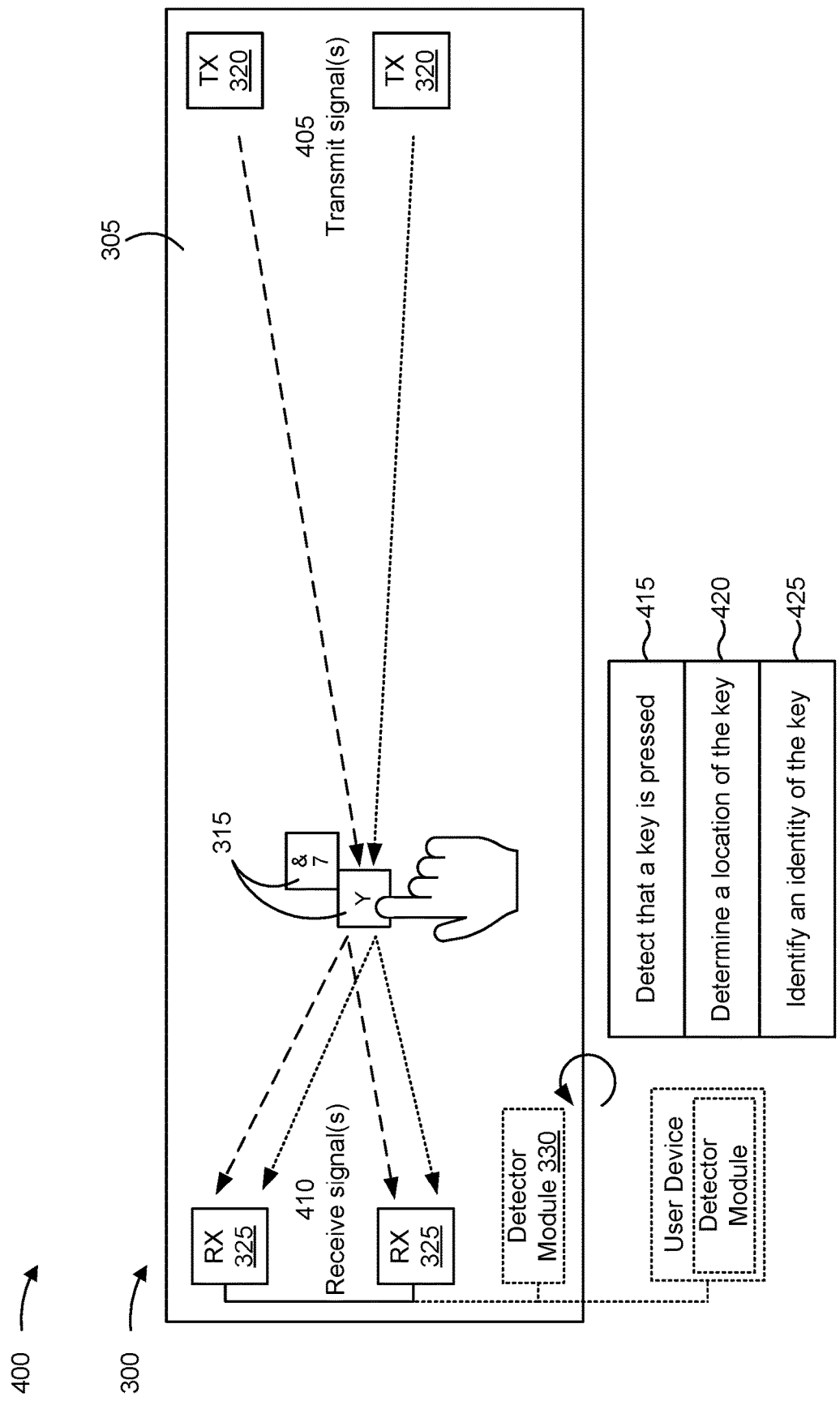
FIG. 4 is a diagram illustrating an example associated with key press detection, in accordance with the present disclosure.

FIG. 4 is a diagram illustrating an example 400 associated with key press detection, in accordance with the present disclosure. As shown in FIG. 4, example 400 includes the device 300, as described above. For example, the device 300 may include the set of transmitters 320 and the set of receivers 325, as described above. The set of transmitters 320 and the set of receivers 325 may have a passthrough configuration (as shown) or a backscatter configuration, as described above. Moreover, the set of transmitters 320 may include multiple transmitters 320 at different depths, and the set of receivers 325 may include multiple receivers 325 at different depths, as described above. In some aspects, the device 300 may store information that identifies a calibration that is to be used for key press detection. For example, the calibration may be based at least in part on locations of the transmitters 320, locations of the receivers 325, a layout of the keys 315, dimensions of the housing 305, or the like.

As shown by reference number 405, the device 300, using the set of transmitters 320, may transmit one or more signals toward the plurality of keys 315, as described above. For example, each transmitter 320, of the set of transmitters 320, may transmit a signal toward the plurality of keys 315. The signals transmitted by the set of transmitters 320 may use the same waveform or different waveforms. In some aspects, a signal may be a pulse signal or a continuous wave signal (e.g., an FMCW signal), as described above. In some aspects, a signal may be in an RF band, such as in a mmWave band, as described above. The transmitters 320 may repeat the signal (e.g., a pulse or a chirp) according to a particular repetition rate, which may be calibrated to achieve a particular sensitivity/response time for key press detection.

In addition, the device 300 may receive, from a user, an input associated with a press of a key 315 (or multiple keys 315). For example, the input may be a press of a key 315 of a keyboard, which may displace at least a portion of the key 315 into the housing 305, as described above. Here, the transmitted signal(s) may reflect from the key 315 (or multiple keys 315) that is pressed (e.g., reflect from the portion of the key 315 displaced into the housing 305). As another example, the input may be a touch to a visual representation of a key 315 on a touchscreen display, which is indicative of a press of the key 315. Here, the transmitted signal(s) may reflect from a part of the user's body (e.g., the user's finger) that is touching the touchscreen display.

As shown by reference number 410, the device 300, using the set of receivers 325, may receive one or more return signals that correspond to the one or more transmitted signals. For example, the return signal(s) may be reflected from a key 315 of a keyboard that is pressed, or reflected from a part of a user's body in connection with a touch of a touchscreen, as described above. Accordingly, the return signal(s) may have different characteristics from the transmitted signal(s), such as a different frequency. In some aspects, the set of receivers 325, to receive the return signal(s), may operate in a MIMO mode (or a SIMO or a MISO mode). For example, the transmissions of each of the transmitters 320 may be received at each of the receivers 325.

As shown by reference number 415, the device 300 (e.g., using the detector module 330) may detect that a key 315 is pressed. When no key 315 is pressed, return signal(s) received by the device 300 may be associated with a baseline set of characteristics (e.g., the device 300 may store information identifying the baseline set of characteristics). For example, the return signal(s) may be associated with a particular frequency, a particular time of arrival at the set of receivers 325, and/or a particular angle of arrival at the set of receivers 325, among other examples. Accordingly, when a key 315 is pressed, return signal(s) received by the device 300 may be associated with a different set of characteristics (e.g., due to reflection of the transmitted signals from the key 315 or from a user's finger). The device 300 may detect that the key 315 is pressed based at least in part on detecting return signal(s) associated with the different set of characteristics (e.g., relative to the baseline set of characteristics).

As shown by reference number 420, the device 300 (e.g., using the detector module 330), may determine a location of the key 315 that is pressed. For example, the device 300 may determine the location of the key 315 that is pressed based at least in part on the return signals received at the set of receivers 325. That is, the return signal(s) may indicate a location of the key 315. In particular, the device 300 may determine the location of the key 315 that is pressed based at least in part on the signals transmitted by the set of the transmitters 320 (e.g., the device 300 may store information identifying characteristics of the transmitted signals) and the return signals received at the set of receivers 325 (e.g., using signal processing). For example, the device 300 may use matched filtering based at least in part on the transmitted signals and the return signals in order to compare (e.g., identify similarities and/or differences between) the transmitted signals and the return signals. In some aspects, the device 300 may determine the location of the key 315 that is pressed based at least in part on information relating to times of arrival of the return signals at the set of receivers 325 (e.g., relative to times of transmission of the signals), information relating to angles of arrival of the return signals at the set of receivers 325, frequency information associated with the return signals, and/or Doppler information associated with the return signals, among other examples.

In some aspects, the device 300 (e.g., using the detector module 330) may determine the location of the key 315 based at least in part on a spatial concentration of energy of the return signals. For example, the device 300 may determine, for each combination of a transmitter 320 and a receiver 325, possible locations of the key 315 (e.g., represented by a curve) based at least in part on a return signal (e.g., corresponding to a signal transmitted by the transmitter 320) received at the receiver 325. As an example, the device 300 may determine first possible locations of the key 315 (e.g., represented by a first curve) based at least in part on a first return signal received at a receiver 325, determine second possible locations of the key 315 (e.g., represented by a second curve) based at least in part on a second return signal received at the receiver 325 or at another receiver 325. Thus, the device 300 may determine the location of the key 315 based at least in part on the first possible locations and the second possible locations. For example, the device 300 may determine that the location of the key 315 is at an intersection of the first possible locations and the second possible locations (e.g., at an intersection of the first curve and the second curve or at a location that includes at least point from each of the curves).

As an example, the device 300 (e.g., using the detector module 330) may determine a first curve indicative of possible locations of the key 315 based at least in part on a first return signal (e.g., corresponding to a signal transmitted by a first transmitter 320) received at a receiver 325, and the device 300 may determine a second curve indicative of possible locations of the key 315 based at least in part on a second return signal (e.g., corresponding to a signal transmitted by a second transmitter 320) received at the receiver 325, and so forth. Additionally, or alternatively, the device 300 may determine a first curve indicative of possible locations of the key 315 based at least in part on a first return signal (e.g., corresponding to a signal transmitted by a transmitter 320) received at a first receiver 325, and the device 300 may determine a second curve indicative of possible locations of the key 315 based at least in part on a second return signal (e.g., corresponding to the signal transmitted by the transmitter 320) received at a second receiver 325, and so forth. Continuing with the examples, the device (e.g., using the detector module 330) may determine the location of the key 315 based at least in part on the curves (e.g., the first curve and the second curve) that are determined (e.g., at an intersection of the curves). In this way, the device 300 may determine a two-dimensional location (e.g., two-dimensional coordinates) of the key 315 that is pressed.

In some aspects, the device 300 may determine a three-dimensional location (e.g., three-dimensional coordinates) of the key 315 that is pressed (e.g., to determine an intensity of the key press in addition to the location of the key 315). As described above, the device 300 may include multiple sets of transmitters 320 at different depths and/or multiple sets of receivers 325 at different depths. Thus, the device 300 may determine depth information based on return signals received by receivers 325 at different depths, in a similar manner as described above.

As shown by reference number 425, the device 300 may identify an identity of the key 315 that is pressed (e.g., a "Q" key, a "Shift" key, a "9" key, or the like). For example, the device 300 may identify the identity of the key 315 based at least in part on the location (e.g., the two-dimensional coordinates) of the key 315. For example, the device 300 may store a mapping of key locations to key identities, and the device 300 may identify the identity of the key 315 based at least in part on the mapping.

In some aspects, the device 300 may provide information associated with the key 315 (e.g., the location of the key 315, the identity of the key 315, and/or the intensity of the press of the key 315) to another device (e.g., a user device). For example, a keyboard device may provide information associated with the key 315 to a user device. In some aspects, the device 300 may perform, or cause another device (e.g., a user device) to perform, one or more actions based at least in part on the location and/or the identity of the key 315 that is pressed. For example, actions may include displaying information associated with the key 315 on a display, performing an operation associated with the key 315, performing an operation based on the intensity of the press of the key 315 (e.g., in connection with a video game), or the like. In some aspects, the other device (e.g., using a detector module, such as a decoding application) may perform one or more operations described above as being performed by the device 300. For example, the device 300 may provide information associated with the transmitted signal(s) and/or the return signal(s) to the other device, and the other device (e.g., using the detector module) may detect that a key 315 is pressed, may determine a location of the key 315, and/or may identify an identity of the key 315, in a similar manner as described above.

As indicated above, FIG. 4 is provided as an example. Other examples may differ from what is described with regard to FIG. 4.

Figure 5:
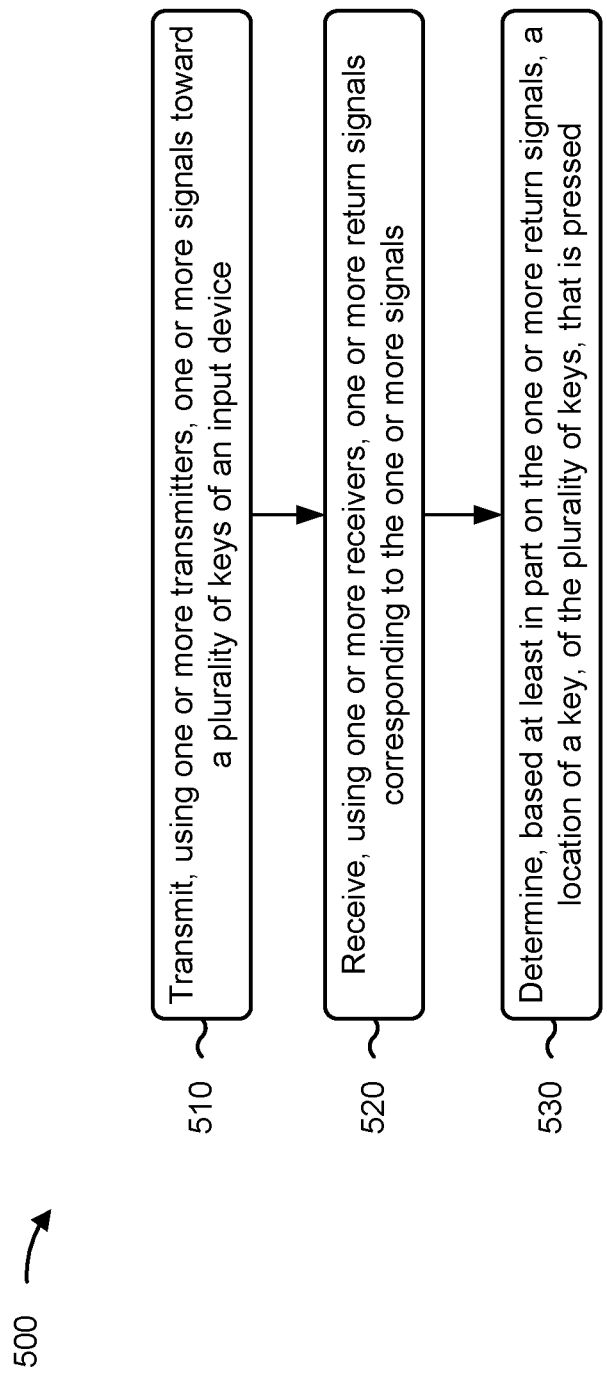
FIG. 5 is a flowchart of an example process associated with key press detection, in accordance with the present disclosure.

FIG. 5 is a flowchart of an example process 500 associated with key press detection. In some implementations, one or more process blocks of FIG. 5 may be performed by a device (e.g., device 300). In some implementations, one or more process blocks of FIG. 5 may be performed by another device or a group of devices separate from or including the device, such as input device 110 and/or user device 120. Additionally, or alternatively, one or more process blocks of FIG. 5 may be performed by one or more components of device 200, such as processor 210, memory 215, storage component 220, input component 225, output component 230, communication interface 235, transmitter 240, and/or receiver 245.

As shown in FIG. 5, process 500 may include transmitting one or more signals toward a plurality of keys of an input device (block 510). For example, the device may transmit one or more signals toward a plurality of keys of an input device of the device, as described above.

As further shown in FIG. 5, process 500 may include receiving one or more return signals corresponding to the one or more signals (block 520). For example, the device may receive one or more return signals corresponding to the one or more signals, as described above.

As further shown in FIG. 5, process 500 may include determining a location of a key, of the plurality of keys, that is pressed (block 530). For example, the device may determine a location of a key, of the plurality of keys, that is pressed, as described above.

Process 500 may include additional implementations, such as any single implementation or any combination of implementations described below and/or in connection with one or more other processes described elsewhere herein.

In a first implementation, the one or more signals are in an RF band.

In a second implementation, alone or in combination with the first implementation, the one or more signals are in a mmWave band.

In a third implementation, alone or in combination with one or more of the first and second implementations, the one or more signals are FMCW signals.

In a fourth implementation, alone or in combination with one or more of the first through third implementations, the one or more transmitters include multiple transmitters, and the one or more receivers include multiple receivers.

In a fifth implementation, alone or in combination with one or more of the first through fourth implementations, the one or more transmitters include multiple transmitters and the one or more receivers include one receiver, or the one or more transmitters include one transmitter and the one or more receivers include multiple receivers.

In a sixth implementation, alone or in combination with one or more of the first through fifth implementations, determining the location of the key includes determining first possible locations of the key based at least in part on a first return signal, of the one or more return signals, received at a receiver of the one or more receivers; determining second possible locations of the key based at least in part on a second return signal, of the one or more return signals, received at the receiver or at another receiver of the one or more receivers; and determining the location of the key based at least in part on the first possible locations and the second possible locations.

In a seventh implementation, alone or in combination with one or more of the first through sixth implementations, the location of the key is determined using matched filtering based at least in part on the one or more signals and the one or more return signals.

In an eighth implementation, alone or in combination with one or more of the first through seventh implementations, process 500 includes identifying an identity of the key based at least in part on the location of the key.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A device, comprising: a housing; an input device adjoined to the housing, the input device configured to receive an input associated with a press of a key of a plurality of keys; one or more transmitters disposed in the housing, the one or more transmitters configured to transmit one or more signals toward the plurality of keys; one or more receivers disposed in the housing, the one or more receivers configured to receive one or more return signals corresponding to the one or more signals; and a processor configured to determine a location of the key based at least in part on the one or more return signals.

Aspect 2: The device of Aspect 1, wherein the input device comprises a keyboard that includes the plurality of keys.

Aspect 3: The device of Aspect 1, wherein the input device comprises a touchscreen configured to display the plurality of keys.

Aspect 4: The device of any of Aspects 1-2, wherein the key is configured to displace from a first position to a second position.

Aspect 5: The device of any of Aspects 1-4, wherein the one or more signals are in a radio frequency (RF) band.

Aspect 6: The device of any of Aspects 1-5, wherein the one or more signals are in a millimeter wave (mmWave) band.

Aspect 7: The device of any of Aspects 1-6, wherein the one or more signals are frequency modulated continuous wave (FMCW) signals.

Aspect 8: The device of any of Aspects 1-7, wherein the one or more transmitters include multiple transmitters, and the one or more receivers include multiple receivers.

Aspect 9: The device of any of Aspects 1-8, further comprising an isolation layer configured to isolate the one or more transmitters and the one or more receivers from external signals.

Aspect 10: The device of any of Aspects 1-9, wherein the one or more transmitters are located at a first end of the housing, and the one or more receivers are located at a second end of the housing.

Aspect 11: The device of any of Aspects 1-9, wherein the one or more transmitters and the one or more receivers are located at a same end of the housing.

Aspect 12: The device of any of Aspects 1-11, wherein the one or more transmitters are located at multiple depths within the housing, and the one or more transmitters are configured to transmit the one or more signals toward the plurality of keys from the multiple depths, and wherein the one or more receivers are located at multiple depths within the housing, and the one or more receivers are configured to receive the one or more return signals at the multiple depths.

Aspect 13: The device of any of Aspects 1-12, wherein a quantity of the one or more transmitters is less than a quantity of the plurality of keys, and wherein a quantity of the one or more receivers is less than the quantity of the plurality of keys.

Aspect 14: A method, comprising: transmitting, by a device using one or more transmitters of the device, one or more signals toward a plurality of keys of an input device of the device; receiving, by the device using one or more receivers of the device, one or more return signals corresponding to the one or more signals; and determining, by the device based at least in part on the one or more return signals, a location of a key, of the plurality of keys, that is pressed.

Aspect 15: The method of Aspect 14, wherein the one or more signals are in a radio frequency (RF) band.

Aspect 16: The method of any of Aspects 14-15, wherein the one or more signals are in a millimeter wave (mmWave) band.

Aspect 17: The method of any of Aspects 14-16, wherein the one or more signals are frequency modulated continuous wave (FMCW) signals.

Aspect 18: The method of any of Aspects 14-17, wherein the one or more transmitters include multiple transmitters, and the one or more receivers include multiple receivers.

Aspect 19: The method of any of Aspects 14-17, wherein: the one or more transmitters include multiple transmitters and the one or more receivers include one receiver, or the one or more transmitters include one transmitter and the one or more receivers include multiple receivers.

Aspect 20: The method of any of Aspects 14-19, wherein determining the location of the key comprises: determining first possible locations of the key based at least in part on a first return signal, of the one or more return signals, received at a receiver of the one or more receivers; determining second possible locations of the key based at least in part on a second return signal, of the one or more return signals, received at the receiver or at another receiver of the one or more receivers; and determining the location of the key based at least in part on the first possible locations and the second possible locations.

Aspect 21: The method of any of Aspects 14-20, wherein the location of the key is determined using matched filtering based at least in part on the one or more signals and the one or more return signals.

Aspect 22: The method of any of Aspects 14-21, further comprising: identifying an identity of the key based at least in part on the location of the key.

Aspect 23: An apparatus, comprising a processor; memory coupled with the processor; and instructions stored in the memory and executable by the processor to cause the apparatus to perform the method of one or more of Aspects 14-22.

Aspect 24: A device, comprising a memory and one or more processors coupled to the memory, the memory and the one or more processors configured to perform the method of one or more of Aspects 14-22.

Aspect 25: An apparatus, comprising at least one means for performing the method of one or more of Aspects 14-22.

Aspect 26: A non-transitory computer-readable medium storing code, the code comprising instructions executable by a processor to perform the method of one or more of Aspects 14-22.

Aspect 27: A non-transitory computer-readable medium storing a set of instructions, the set of instructions comprising one or more instructions that, when executed by one or more processors of a device, cause the device to perform the method of one or more of Aspects 14-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
    a housing;
    an input device adjoined to the housing, the input device configured to receive an input associated with a press of a key of a plurality of keys;
    a set of transmitters disposed in the housing; and
    a set of receivers disposed in the housing,
        wherein the set of transmitters and the set of receivers are configured to operate using a multiple input multiple output (MIMO) scheme,
        wherein the set of transmitters are configured to transmit one or more signals towards the key and the set of receivers are configured receive one or more return signals from the key using a multiple input multiple output (MIMO) scheme,
        wherein the one or more return signals correspond to the one or more signals, and
        wherein the set of receivers are located at multiple depths within the housing to determine a three-dimensional location of the key based on the one or more return signals being received by the set of receivers located at the multiple depths.

2. The device of claim 1, wherein the input device comprises a keyboard that includes the plurality of keys.

3. The device of claim 1, wherein the input device comprises a touchscreen configured to display the plurality of keys.

4. The device of claim 1, wherein the key is configured to displace from a first position to a second position.

5. The device of claim 1, wherein the one or more signals are in a radio frequency (RF) band.

6. The device of claim 1, wherein the one or more signals are in a millimeter wave (mmWave) band.

7. The device of claim 1, wherein the one or more signals are frequency modulated continuous wave (FMCW) signals.

8. The device of claim 1, further comprising an isolation layer configured to isolate the set of transmitters and the set of receivers from external signals.

9. The device of claim 1, wherein the set of transmitters are located at a first end of the housing, and the set of receivers are located at a second end of the housing.

10. The device of claim 1, wherein the set of transmitters and the set of receivers are located at a same end of the housing.

11. The device of claim 1,
    wherein the set of transmitters are located at a plurality of depths within the housing, and
    wherein one or more of the plurality of depths of the set of transmitters are different from one or more of the multiple depths of the set of receivers.

12. The device of claim 1, wherein a quantity of the set of transmitters is less than a quantity of the plurality of keys, and
    wherein a quantity of the set of receivers is less than the quantity of the plurality of keys.

13. The device of claim 1,
    wherein the one or more return signals comprise a plurality of return signals corresponding to a signal, of the one or more signals, from a transmitter of the set of transmitters, and
    wherein the MIMO scheme comprises a first return signal, of the plurality of return signals, being received at a first receiver of the set of receivers and a second return signal, of the plurality of return signals, being received at a second receiver of the set of receivers.

14. The device of claim 1,
    wherein the set of transmitters are located at a plurality of depths within the housing, and
    wherein the plurality of depths of the set of transmitters are same as the multiple depths of the set of receivers.

15. The device of claim 1, wherein the set of transmitters comprises:
    a first set of transmitters located at a first depth, and
    a second set of transmitters located at a second depth that is further from a surface of the housing than the first depth.

16. A method, comprising:
    transmitting, by a device using a set of transmitters of the device, one or more signals toward a key of a plurality of keys of an input device of the device;
    receiving, by the device using a set of receivers, of the device, located at multiple depths, one or more return signals corresponding to the one or more signals,
        wherein the set of transmitters and the set of receivers are configured to operate using a multiple input multiple output (MIMO) scheme; and
    determining, by the device based at least in part on the one or more return signals being received using the set of receivers that are located at the multiple depths, a three-dimensional location of the key.

17. The method of claim 16, wherein the one or more signals are in a radio frequency (RF) band.

18. The method of claim 16, wherein the one or more signals are in a millimeter wave (mmWave) band.

19. The method of claim 16, wherein the one or more signals are frequency modulated continuous wave (FMCW) signals.

20. The method of claim 16, wherein the three-dimensional location of the key is determined using matched filtering based at least in part on the one or more signals and the one or more return signals.

21. The method of claim 16, further comprising:
identifying an identity of the key based at least in part on the three-dimensional location of the key.

22. The method of claim 16,
wherein the one or more return signals comprise a plurality of return signals corresponding to a signal, of the one or more signals, from a transmitter of the set of transmitters, and
wherein the MIMO scheme comprises a first return signal, of the plurality of return signals, being received at a first receiver of the set of receivers and a second return signal, of the plurality of return signals, being received at a second receiver of the set of receivers.

23. A non-transitory computer-readable medium storing a set of instructions, the set of instructions comprising:
one or more instructions that, when executed by one or more processors of a device, cause the device to:
transmit, using a set of transmitters of the device, one or more signals toward a key of a plurality of keys of an input device of the device;
receive, using a set of receivers, of the device, located at multiple depths, one or more return signals corresponding to the one or more signals,
wherein the set of transmitters and the set of receivers are configured to operate using a multiple input multiple output (MIMO) scheme; and
determine, based at least in part on the one or more return signals being received using the set of receivers that are located at the multiple depths, a three-dimensional location of the key.

24. The non-transitory computer-readable medium of claim 23, wherein the one or more signals are in a millimeter wave (mmWave) band.

25. The non-transitory computer-readable medium of claim 23, wherein the location of the key is determined using matched filtering based at least in part on the one or more signals and the one or more return signals.

26. The non-transitory computer-readable medium of claim 23,
wherein the one or more return signals comprise a plurality of return signals corresponding to a signal, of the one or more signals, from a transmitter of the set of transmitters, and
wherein the MIMO scheme comprises a first return signal, of the plurality of return signals, being received at a first receiver of the set of receivers and a second return signal, of the plurality of return signals, being received at a second receiver of the set of receivers.

27. An apparatus, comprising:
means for transmitting, using a set of transmitters of the apparatus, one or more signals toward a key of a plurality of keys of an input device of the apparatus;
means for receiving, using a set of receivers, of the device, located at multiple depths, one or more return signals corresponding to the one or more signals,
wherein the set of transmitters and the set of receivers are configured to operate using a multiple input multiple output (MIMO) scheme; and
means for determining, based at least in part on the one or more return signals being received using the set of receivers that are located at the multiple depths, a three-dimensional location of the key.

28. The apparatus of claim 27, wherein the one or more signals are in a millimeter wave (mmWave) band.

29. The apparatus of claim 27, further comprising:
means for identifying an identity of the key based at least in part on the three-dimensional location of the key.

30. The apparatus of claim 27,
wherein the one or more return signals comprise a plurality of return signals corresponding to a signal, of the one or more signals, from a transmitter of the set of transmitters, and
wherein the MIMO scheme comprises a first return signal, of the plurality of return signals, being received at a first receiver of the set of receivers and a second return signal, of the plurality of return signals, being received at a second receiver of the set of receivers.

* * * * *